United States Patent [19]

Wheeler

[11] 4,116,092

[45] Sep. 26, 1978

[54] DEVICE FOR STRIPPING INSULATION FROM A WIRE

[75] Inventor: Charles Joseph Wheeler, Geneva, Ohio

[73] Assignee: Ashtabula Development Co., Ashtabula, Ohio

[21] Appl. No.: 805,699

[22] Filed: Jun. 13, 1977

[51] Int. Cl.² .............................................. H02G 1/12
[52] U.S. Cl. .................................... 81/9.5 R; 30/90.1
[58] Field of Search ............ 30/90.1; 81/9.5 R, 9.5 A

[56] References Cited

U.S. PATENT DOCUMENTS

| | | | |
|---|---|---|---|
| 3,103,837 | 4/1963 | Allen et al. | 81/9.5 R |
| 3,422,708 | 1/1969 | Bieganski | 81/9.5 A |
| 3,731,561 | 5/1973 | Mongredien | 81/9.5 A |
| 3,736,606 | 6/1973 | Raum et al. | 81/9.5 R X |
| 3,880,022 | 4/1975 | Miller | 81/9.5 R |
| 3,915,037 | 10/1975 | Wiener | 81/9.5 A |

Primary Examiner—James L. Jones, Jr.
Assistant Examiner—James G. Smith
Attorney, Agent, or Firm—Teare, Teare & Sammon

[57] ABSTRACT

The present invention relates to a wire stripping device. A pair of jaws mount a first pair of cutting blades for movement towards each other substantially in a plane to cut insulation. A yoke with spring arms mounts a second pair of cutting blades at right angles to the first blades for movement towards each other substantially in the same plane as the first blades as well as for movement axially when an adjustable stop is reached. A first handle, through linkage, moves the jaws, and the jaws by cam ears move the yoke arms whereby all the blades are caused to move towards a central axis during the insulation cutting action. The second handle connected by a push bar to the yoke moves the yoke axially to separate the first and second blade means when a spring bias is overcome when the stop is reached.

13 Claims, 14 Drawing Figures

DEVICE FOR STRIPPING INSULATION FROM A WIRE

BACKGROUND OF THE INVENTION

The present invention relates to devices for stripping insulation from electric wires. Electic wires generally have a relatively thick coating of electric insulation material surrounding the wire along its length. When the wire is initially installed, or when new connections of pre-installed wiring are to be made, it is necessary to strip the insulation from the end of the wire a sufficient distance to provide a good electrical connection.

Various problems have existed with prior art wire stripping devices which hindered both the speed and the quality of the stripping operation. For example, in one type of wire stripping device, a portion of the device would grip the insulation, while a pair of cutters moved radially inwardly to cut a portion of the insulation and then moved axially away from the grippers to strip the insulation. In such devices, there was the risk that where the insulation was greasy or otherwise slippery, the gripping means would slide on the insulation, thereby hampering the stripping operation. In other instances, the insulation was of such a tough, such as fibrous, material, that the speed, and sometimes the effectiveness of the stripping operation was severely hampered.

Some of the stripping devices required the device to be at right angles rather than parallel to the wire. This hampered many stripping operations where it was difficult to use the strippers at such right angle position.

A still further problem existed in stripping a bent wire. In stripping a wire by a device that moved axially of the wire, the device often straightened the wire. This presented further difficulties in speed of performance and incurred the risk of a breaking or otherwise deforming the wire.

A further difficulty with prior art devices related to the degree and kind of cutting necessary for proper stripping action to occur. In some such devices, for example, the blades were semi-circular in cross section. The particular shape was used so that the blades could but all or most of the insulation, by providing a completely circular cutting surface when the blades were closed to the desired extent. One problem with such device was that a different cutter would be needed for different sizes of wire; otherwise, the aforesaid circular relationship could not be achieved.

In other types of devices, the blades were V-shaped. Such shapes provided an inadequate stripping action. For example, the device would go off-center if one blade was sharper than the other, resulting in a cutting or nicking of the wire. Moreover, the device would often wobble or move laterally in the stripping action so as to leave portions of the insulation adhered to the wire. Moreover, in devices where the V-shaped cutters were used, such as in U.S. Pat. No. 3,880,022, it was difficult to cut a sufficient amount of insulation so as to be ineffective on many types of insulation.

In some other prior art devices, in order to increase the potential for stripping wire despite the hardness or the toughness of the insulation material, it was necessary to adjust the cutting blade depth to come so close to the conductive wire that there was a tendency to nick, cut or otherwise distort the conductive wire.

SUMMARY OF THE INVENTION

In accordance with the present invention, an improved wire stripping device is provided. In the preferred form of the device, four blade means are disposed angularly with respect to each other and generally radially of a central axis whereby the blades are positively urged to converge from four directions towards the central axis to cut the insulation, with the blade means being disposed in or sufficiently close to a common plane whereby all of the blade means are disposed within the cut made in the insulation. One pair of blade means is then moved axially whereby such blade means engages and exerts pressure against one of the insulation faces and the other pair of blade means engages the opposite face of the insulation during the stripping action.

By the foregoing arrangement, a wire stripping tool is proved having superior advantages. Such device rapidly, neatly and cleanly strips wires with a tool disposed axially of the wire end. The stripping takes place even though the outer surface of the insulation may be greasy or otherwise slippery, or wherein the insulation is of particularly tough material. The device performs such stripping even though the blades have not completely cut the insulation prior to the stripping action. As a result, the blades in their cutting action may cease their radially inward motion a sufficient distance from the exposed wire to avoid nicking, cutting or otherwise distorting the current conducting wire. Depending upon the type of insulation involved, for example, the blades need cut approximately 50% of the thickness of the insulation, while still providing the aforesaid clean and neat and rapid stripping action even with tough materials. The device can strip bent wires without distorting or needing to straighten the wires.

Another advantage of the device is that it provides a clean stripping where the insulation section to be removed is unusually long or where the operator inadvertently fails to insert the tool the desired distance. In either case, the insulation can be removed by "walking" the device along the insulation by repeatedly opening and closing the handles as the device is moved axially of the insulation.

The device is self-centering, and thus unaffected by variations in sharpness of the various blade means, thereby providing a clean cut and stripping of the insulation without cutting or nicking the conductive wire.

A strong positive cutting action is provided for a rapid and clean cut using a single device adjustable to accommodate different insulation thickness.

DESCRIPTION OF THE PREFERRED EMBODIMENTS

Figure 1:
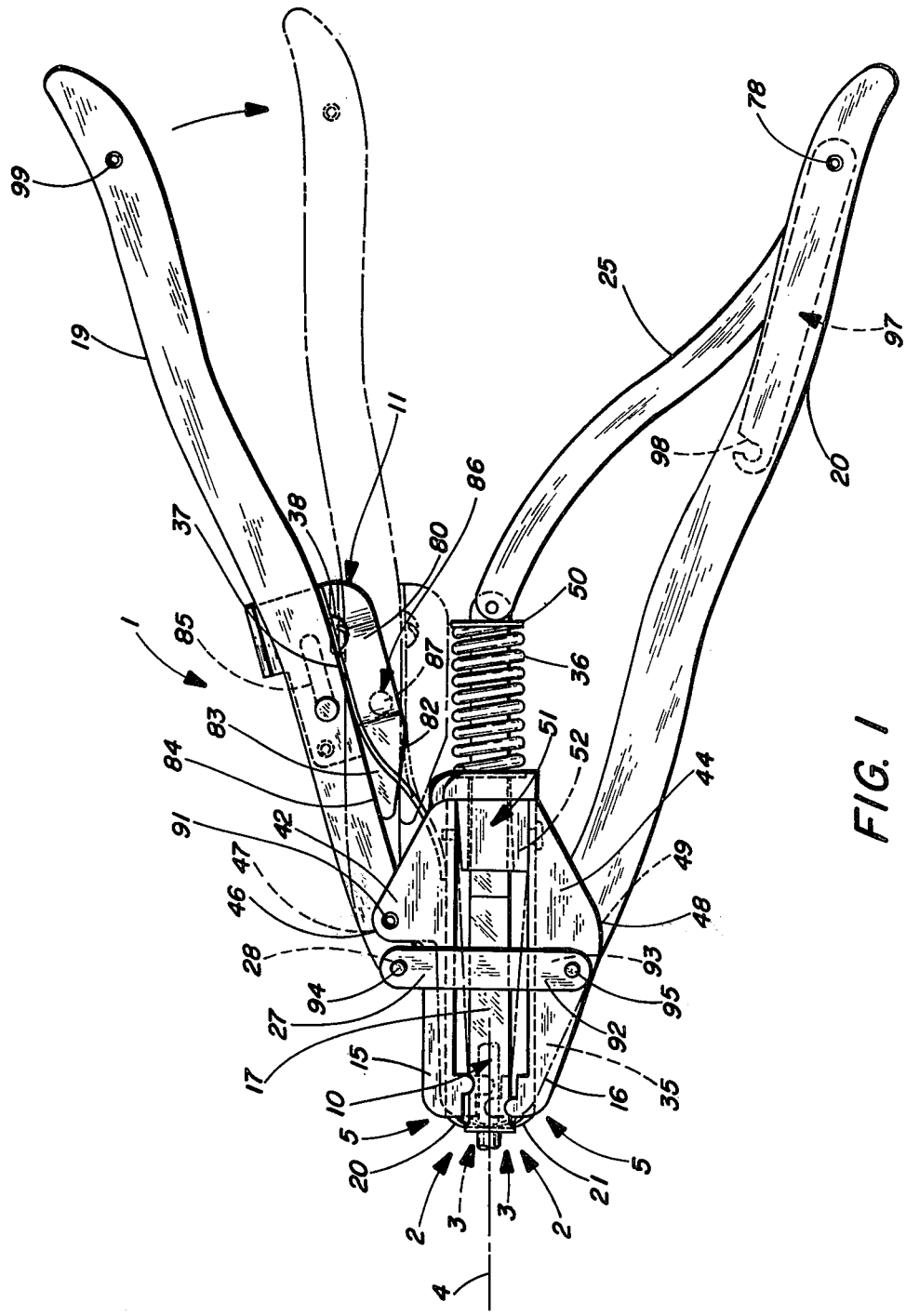
FIG. 1 is an elevation view of a wire stripping device in accordance with the present invention with the solid lines illustrating the position of the device prior to commencement of the insulation cutting action, with the position of the device at the completion of the insulation cutting action shown in phantom.
Figure 5:
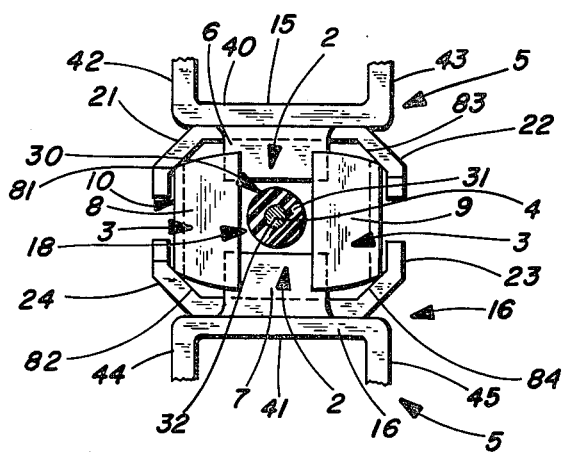
FIG. 5 is a partially broken away enlarged end view of the cutter blades illustrating the position of the cutting blades prior to commencement of the cutting action.
Figure 12:
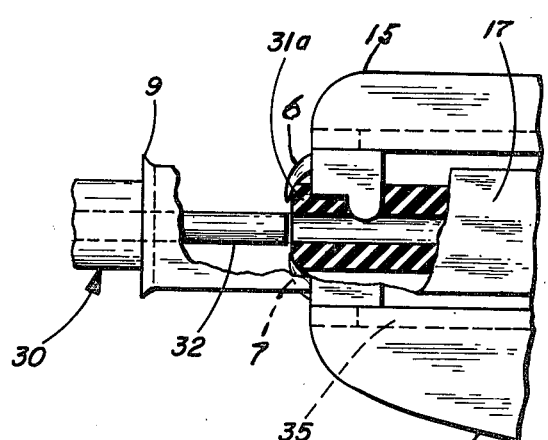
FIG. 12 is a partially broken away enlarged elevation view illustrating the position of the cutting blades relative to the insulation upon completion of the stripping action and immediately preceeding the stripped portion of the insulation falling through the device.
Figure 13:
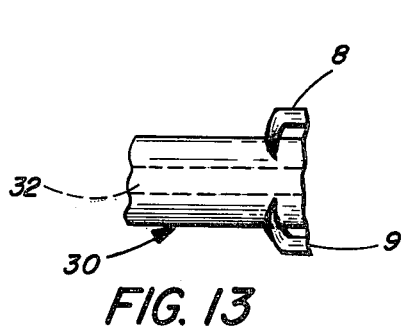
FIG. 13 is a broken away illustrative view of the action of the yoke blades in cutting into the insulation prior to the stripping action.
Figure 14:
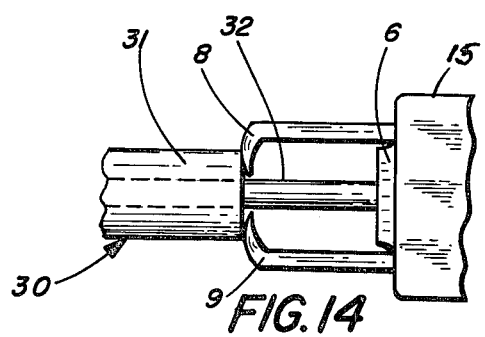
FIG. 14 is a broken away illustrative view of the yoke blades and one of the jaw blades relative to the retained insulation and stripped conductive wire upon completion of the stripping action.

A preferred form of manual device 1 for stripping a wire in accordance with the invention is illustrated in FIGS. 1 and 5. A first 2 and second 3 cutting means are disposed about an imaginary axis 4. The first cutting means 2 is provided with a first mounting means 5 in the form of a pair of oppositely disposed jaws 15 and 16. Jaws 15 and 16 carry an oppositely disposed first pair of cutting blades 6 and 7 respectively disposed generally radially with respect to the axis 4. The jaws 15 and 16 are operably connected to a pair of handles 19 and 20. Upon movement of the handles 19 and 20, the jaws 15 and 16 cause the first pair of cutting blades 6 and 7 to move generally radially with respect to the imaginary axis 4. The second cutting means 3 is provided with a second mounting means 10 in the form of a spring metal yoke 17 carrying a second pair of oppositely disposed blades 8 and 9 with the second pair of blades 8 and 9 being positioned at right angles to the first pair of blades 6 and 7 but substantially in the same plane therewith. The spring metal yoke 17 is biased to be normally open so that when the handles 19 and 20 are opened, the first and second blade means 2 and 3 define an opening 18, (FIG. 5) into which the end of the insulation coated wire 30 which is to be stripped is inserted generally along the axis 4. The yoke 17 is operably connected to the jaws 15 and 16 by cam ears 21, 22, 23, and 24 whereby closure of the jaws 15 and 16 with the consequent radially inward movement of the first pair of cutting blades 6 and 7 simultaneously causes a substantially radial closing movement of the yoke and thus of cutting blades 8 and 9 so that the insulation 31 is simultaneously cut from four sides. The closure and cutting continues until a cutting stop means shown generally at 34 adjusted for wire size, is engaged. The yoke 17 is also slidably mounted so that when the stop means 11 is reached, further closure of handles 19 and 20 (FIG. 2) causes a push bar 25 attached to the yoke to urge the yoke 17, and thus the second pair of blades 8 and 9 axially outward of the device 1. Since the first pair of blades 6 and 7 engages the insulation 31 on one side of the cut and the second pair of blades 8 and 9 engages the insulation on the other side, the separation of the blades causes the insulation 31 to be stripped from the conductor 32. The stripped insulation 31a (FIG. 12) then falls through the opening 35 in lower jaw 16. Spring means 36 and 37 are provided for returning the components to their starting position when pressure on the handles 19 and 20 is released.

Figure 6:
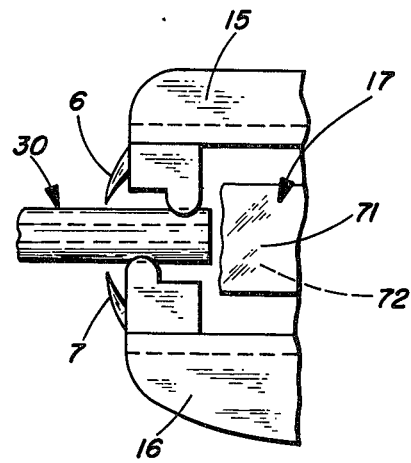
FIG. 6 is a partially broken away elevation view showing the cutting blades on the jaw means prior to commencement of the cutting action.
Figure 9:
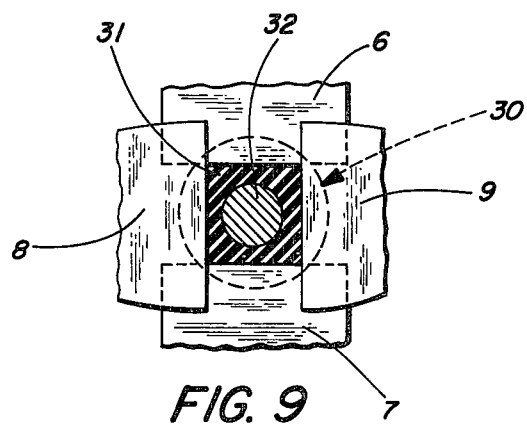
FIG. 9 is an enlarged cross-sectional end view illustrating an example of the extent of cutting of the insulation upon completion of the cutting action.

The mounting means for the first cutting means is arranged to permit a first pair of cutting blades 6 and 7 to move generally in a plane by planar movement or by swinging in an arc generally radially of the imaginary axis 4 so as to penetrate and cut a portion of the insulation 31 on opposite sides of the conductor wire 32. In the form shown, the mounting means for the first cutting means, 2 (FIG. 1) includes a pair of jaws 15 and 16 which are generally u-shaped in cross section (FIG. 5) with respective spring metal bases 40 and 41 and walls 42, 43, 44 and 45. The walls 42, 43, 44 and 45 are generally triangular in elevation, each having an upper apex 46, 47, 48 and 49 (FIG. 1). The upper jaw 15 has a portion of one side of the triangle cut away. The jaw bases 40 and 41 (FIG. 3) are connected at one end by hinge block 51. The bases 40 and 41 of the jaws 15 and 16 are cantilevered from the hinge block 51 for generally radial movement or swing relative to the axis 4. The hinge block 51 has a generally unequal truncated pyramidal snout 52, and an L-shaped cap portion 53. The snout 52 has an inclined top face 54 (FIG. 3) relative to axis 4 and a bottom face 55 parallel to such axis. The bottom face 55, terminating in integral projecting flange 56 of cap portion 53, provides a ledge to retain one end of base 41 of lower jaw 16 parallel to axis 4 when the spring metal base is in the relaxed state. The top face 54 of hinge block 51 terminates at the integral flange face 61 of cap portion 53. Flange face 61 has a projecting hook-end 62 spaced from upper snout face 54 and parallel to the axis 4 to provide with the end of snout face 54 and of flange 61 a nest for base 40 of jaw 15. The hinge block 51 has a central passage 57 generally rectangular in cross-section and having an upper face 58 generally parallel to axis 4, and a lower face 59 having a taper generally parallel to the taper of upper hinge block face 54. A projection 65, at its head end 67 secures base 41 of jaw 16 to face 55 of hinge block 51. Roll pins 65a and 65b provides a post for movement of base 40 of jaw 15 generally radially of axis 4 from the relaxed position shown (at which it is initially held by handle 19 as later described herein) to the compressed position against plug snout 54. The aforesaid configuration of passage 57 then permits upward movement of base 41 of jaw 16, and thus of cutting blade 7 (FIGS. 5 and 6) simultaneous with the downward movement of base 40 of jaw 15, and thus of cutting blade 6. By such arrangement, blades 6 and 7 can move from the open position of FIG. 5 to the partially closed position of FIG. 7 of blades 6 and 7 to cut their desired depth into the insulation, as shown in FIG. 9. The blades 6, 7, 8 and 9 are arranged relative to each other to define a substantially square opening 18.

Figure 3:
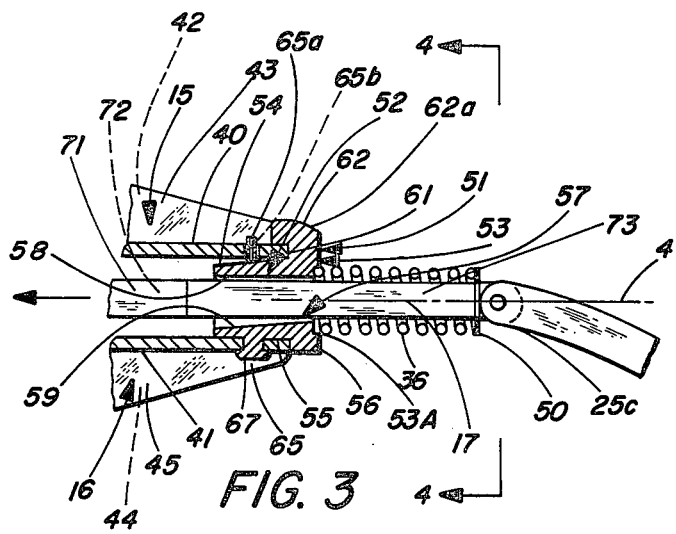
FIG. 3 is a cross-sectional elevation view of the mounting of the stripper blade return spring.
Figure 4:
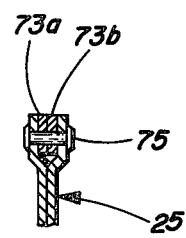
FIG. 4 is a cross-sectional view taken along the lines 4—4 in FIG. 3.
Figure 10:
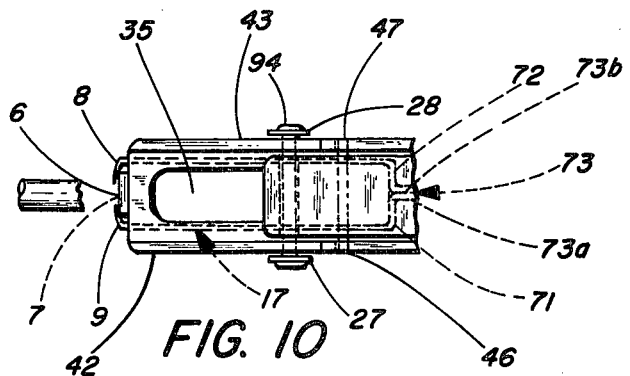
FIG. 10 is a partial top plan view of the front portion of the wire-stripping device; taken along the lines 10—10 in FIG. 2.
Figure 11:
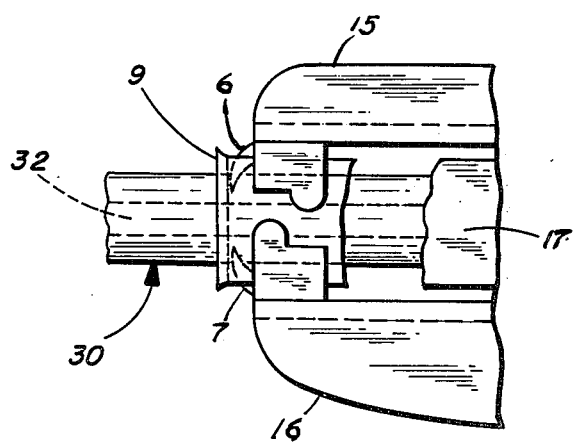
FIG. 11 is a partially broken away enlarged elevation view illustrating the position of the cutting blades relative to the insulation just prior to commencement of the stripping action.

The mounting means for the second cutting means is adapted to permit a second pair of cutting blades 8 and 9 which are disposed at right angles to the first pair of blades 6 and 7 to move radially simultaneously with the first blades 6 and 7, in substantially the same plane therewith, a predetermined distance until the insulation has been cut by a predetermined amount, and then to move axially of the imaginary axis 4 to coact with the then axially relatively stationary first cutting means to strip the insulation from the wire end. The mounting means for the second cutting means includes a spring metal yoke 17 (FIGS. 3 and 10), which has a pair of arms 71 and 72 and a leg portion 73. The leg 73, which consists of pieces 73a and 73b (FIG. 4), which are respective continuations of arms 71 and 72, projects through the passageway 57 in hinge block 51. As shown in FIGS. 3 and 4, the leg 73 of yoke 17 is pivotally connected at its far end to push bar 25 by rivet 75. Push bar 25, in turn, is connected by roll pin 78 to the second handle 20. The yoke 17 is initially held against axial movement by yoke return spring 36, which encompasses a portion of leg 73. Yoke return spring 36, at one end, abuts notch 53a in hinge block cap 53 and at the other end engages washer 50 which is disposed between spring 36 and the end 25c of push bar 25. By the foregoing arangement, spring 36 is biased to retain yoke 17 from axial movement until such time as push bar 25 is activated to overcome the resistance of spring 36 and to push yoke 17 axially forward.

Figure 7:
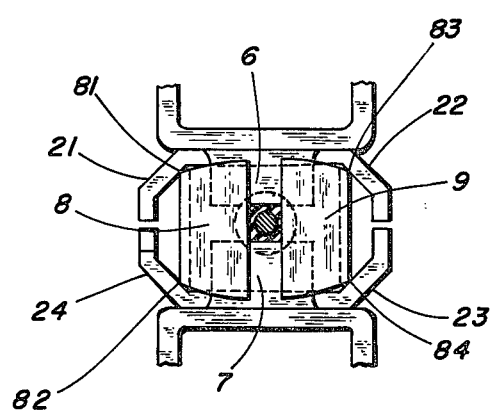
FIG. 7 is a partially broken away enlarged end view of the cutter blades illustrating the cutting blades upon completion of the cutting action.
Figure 8:
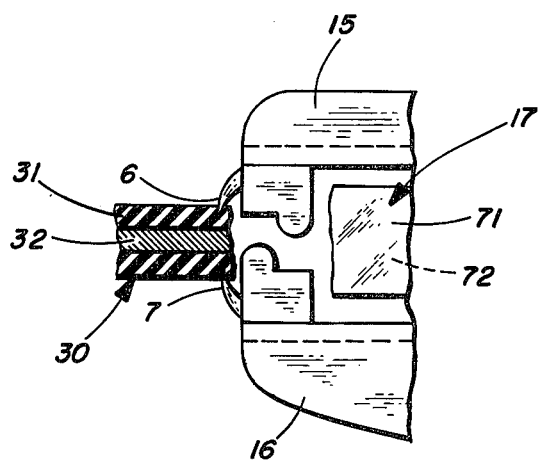
FIG. 8 is a partially broken away elevation view of the cutting blades on the jaw means upon completion of the cutting action.

The end of the yoke 17 opposite from leg 73 (FIG. 3) contains arms 71 and 72 which terminate in second cutting blades 8 and 9. The yoke arms 71 and 72 are disposed so that the second cutting blades 8 and 9 are positioned at right angles to the first cutting blades 6 and 7 for movement in substantially the same plane therewith until the resistance of spring 36 is overcome, but with the second cutting blades 8 and 9 being disposed slightly forward of the first cutting blades 6 and 7. In accordance with the preferred embodiment of the present invention, means are provided to cause the movement of the second cutting blades 8 and 9 radially inwardly in concurrent movement with the radial inward movement of the first blades 6 and 7. This is accomplished in the preferred embodiment by cam ears 21, 22, 23 and 24 respectively, which projects from the ends of jaws 15 and 16. As shown in FIGS. 5 and 7, the cam ears 21, 22, 23 and 24 have inclined camming surfaces 81, 82, 83 and 84 which ride along the edges of yoke arms 71 and 72 to urge the spring metal arms and thus the second cutting blades 8 and 9 radially inward at right angles to the first cutting blades 6 and 7 as the jaws 15 and 16 move the first cutting blades 6 and 7 inwardly.

The extent of radial inward movement of the cutting blades 6, 7, 8 and 9 and the point at which the axial movement of blades 8 and 9 relative to blades 6 and 7 commences, is determined by a stop means 11. The stop means 11 is made adjustable so that the stripper may be used with different size wires.

In the form shown in FIG. 1, the stop means is a cam 80 having a tapered cam surface 82. The cam 80 is slidably mounted on the first handle means 19 by a bent flange 83 which rides along the inner edge 84 of the first handle means and a slot 85 in the cam 80 which rides along a rivet 86. The rivet head 87 is sufficiently spaced from the first handle means 19 to permit the sliding movement of the cam 80 along the handle 19, while sufficiently close to the handle 19 to provide a frictional stop. The cam 80 is positioned on the handle 19 so that the inclined cam surface 82 is slidably disposed so that the selected portion of the cam surface 82 can engage the top surface 62A of hook 62 of cap 53 of the hinge block 51 to thereby vary the extent of movement of the first handle 19 which causes the radial inward movement of the cutting blades 6, 7, 8 and 9 as discussed hereinafter. As a result, the depth of cut is determined by the portion of the cam surface 82 disposed between the first handle 19 and the hinge block 51. Where the cam surface 82 is slid forward, the depth of the cut is less and when moved rearwardly, the depth of cut is increased.

When the first handle 19 (pivotally mounted as hereinafter described) engages the stop means 11, the resistance of spring 36 is overcome and leg 73 of yoke 17 can move axially of a passageway 57 thereby moving yoke arms 71 and 72 and thus blades 8 and 9 axially away from blades 6 and 7 to strip the insulation from the wire. As the arms 71 and 72 move axially, cam ears 21, 22, 23 and 24 remain radially stationary and thus blades 8 and 9 during the axial stripping movement substantially remain the same radial distance from axis 4 as they were when the cutting action ceased. The lower jaw 16 has an elongated rectangular shaped aperture 35 (FIG. 1) through which the stripped insulation can fall. It is to be understood that it is the relative axial movement between the first and second blade means that causes the stripping action, and that in reality blades 8 and 9 can be considered as being held stationary against the exposed face of the remaining insulation and the conductor with the blades 6 and 7 being moved.

The motive and sequencing means to cause the first and second mounting means to move the cutting blades 6, 7, 8 and 9 radially of axis 4 in a cutting motion and then move the first and second cutting means axially apart in a stripping action is provided by handles 19 and 20, stripper-spring 36, push bar 25 and associated linkage means. Handle 19 is pivotally attached to upper jaw 15, walls 42 and 43 (FIG. 10), adjacent walls 46 and 47 by roll pin 91 which spans the walls and passes through handle 19. Handle 19 is also pivotally attached to lower jaw 16 and second handle 20 by links 27 and 28 which are disposed forwardly of jaw wall apices 46, 47, 48 and 49 by pivot pins 94 and 95. When manual pressure is exerted on handles 19 and 20, handle 19 pivots about pin 94 causing pin 91 to assert radially inward pressure on jaw 15 to cause base 40 to swing blade 6 radially inward. The closing movement of handle 19 simultaneously raises pivot pin 94 at one end of links 92 and 93 thereby raising pivot pin 95 at the other end of such links. The raising of pivot pin 95 causes the end of lower jaw 16 to rock upward to swing blade 7 radially inward. As previously mentioned, such radially inward movement of jaws 15 and 16 causes cam ears 21, 22, 23 and 24 to simultaneously move yoke arms 71 and 72 radially inward. Handle 20 also begins to swing inward due to the slack created by upward movement of pin 95. Spring 36 is selected of sufficient strength to keep push bar 25 from moving yoke 17 axially until cam surface 82 engages hinge block cap 53 thereby preventing further radially inward movement of the first handle 19 and further movement of links 27 and 28 thus freezing radial movement of jaws 15 and 16. Further, hand pressure will then overcome the resistance of spring 36. Push bar 25 will compress spring 36 and move yoke leg 73 and thus yoke arms 71 and 72 to thereby move second blade means 8 and 9 axially apart from blades 6 and 7 to strip the partially cut insulation in a tearing action that results in a clean stripping of the insulation from the wire.

Springs 36 and 37 and spring arms 71 and 72 provide the means to restore the device to its original position. When manual pressure is lessened, spring 36 again regains control, returning the blades to their original axial location in substantially the same plane, and moving the second handle 20 to its open position. A handle leaf spring 37 having one end attached to the first handle 19 by screw 38 and the free end engaging the top 39 of hinge block 51, provides the means to return the first handle to its open position and restore jaw base 40 to its open upper position.

A swingable clasp 97 pivotally mounted at one end by pin 78 nests in the U-shaped cavity of the inside of the second handle 20 when the stripper is in use. In order to maintain the device stored with the handles in the closed position, the clasp 97 is swung about pin 78 until hook 98 at the end of clasp 97 engages a pin 99 which spans the hollow walls of U-shaped in cross-section handle 99.

It is to be understood that in other modifications, other means could be used to mount the blade means, and other mounting means, such as power actuation by a hydraulic piston (not shown) or the like could be used.

The phrase, "substantially the same plane", as used herein, means that the paths travelled by the blade means during the cutting action, whether such paths are planar or curved are sufficiently close to a common plane that all of the blades are disposed within the cut made in the insulation, or are sufficiently close thereto that upon separation of the blades, substantially one cut is produced by such blades.

It is to be understood that more than two pairs of blades, or their equivalents, could be used, as well as separate gripping means.

Operation

Figure 2:
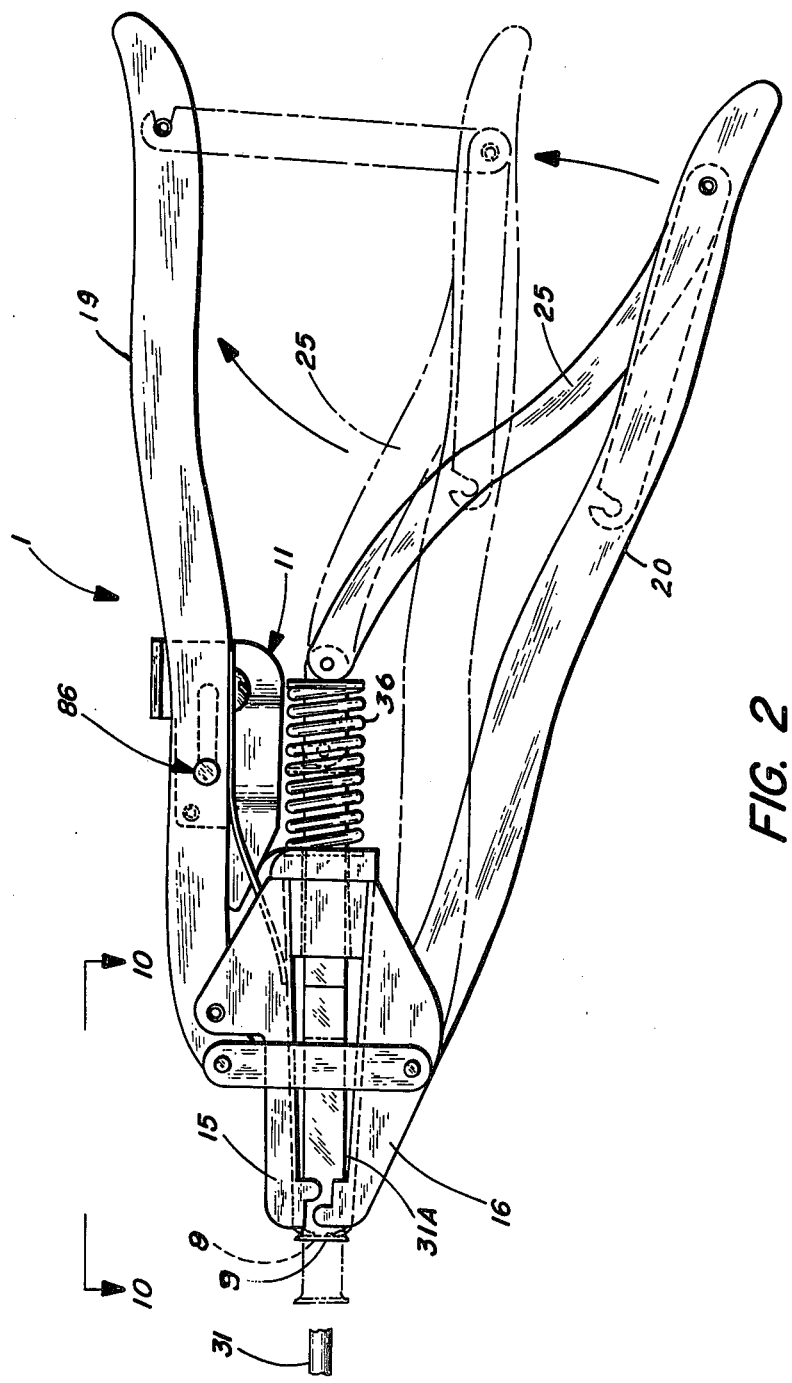
FIG. 2 is an elevation view of the wire stripping device with solid lines showing the position of the device prior to commencement of the stripping action, and the phantom lines showing the device at the end of the stripping action.

In operation of the wire stripping device of FIGS. 1 and 2, the stop means 11 is adjusted for the insulation thickness to be cut. It should be set to cut between ½ to ⅔ of the thickness of the insulation depending on the type of insulation. The handles 19 and 20 are then gripped lightly, and the device is moved axially of the insulated wire end so that the end to be stripped is inserted into the opening 12 defined by blade means 6, 7, 8 and 9. The handles 19 and 20 are then manually squeezed, causing the first handle 19 to move towards the second handle 20 thereby causing the jaws 15 and 16 to begin to close by the moving of linke 27 and 28. The closing of jaws 15 and 16 causes the first blade means 6 and 7 mounted at the ends of the jaws to cut into the insulation from opposite quadrants and simultaneously (due to the action of cam ears 21, 22, 23 and 24), causes the second blade means 8 and 9 to cut into the insulation from quadrants at right angles to the first cutting. As a result, partial cutting of the insulation occurs. The cutting action continues until the stop means 11 halts the cutting at the predetermined distance of penetration into the insulation. At such point the resistance of spring 36 is overcome, and the second handle 20 moves towards the first handle to cause the push bar 25 to move the yoke 17 axially to axially separate the second blade means 8 and 9 from the first blade means 6 and 7. By such action the at least partially cut insulation is stripped from the wire end and falls through the aperture 18 in lower jaw 16. The release of manual pressure on handles 19 and 20 allows spring 36 to open the second handle 20 and restore yoke 17 and second blade means 8 and 9 to their pre-stripping position. Spring 37 then opens the first handle 19 so as to restore the device to its original starting position.

I claim:

1. A device for stripping insulation from a wire comprising,
    first blade means of at least two blades having cutting edges,
    first mounting means mounting said blades of the first blade means opposite each other at an angle to an imaginary axis,
    the first mounting means being movable to move at least one of the said blades towards another of said blades in substantially the same plane,
    second blade means of at least two blades having cutting edges,
    second mounting means mounting said blades of the second blade means opposite each other at an angle to the blades of the first blade means,
    the second mounting means being movable to move at least one of said blades of the second blade means towards another of the blades of the second blade means to a location wherein the blades of the second blade means are substantially in the same plane with the blades of the first blade means, and then to move the second blade means axially of the imaginary axis away from the first blade means, and
    motive means operably connected to the first and second mounting means to move said mounting means.

2. A device according to claim 1, wherein said first blade means are disposed for movement in said plane substantially at right angles to said second blade means.

3. A device according to claim 1, wherein said plane is disposed substantially radially relative to said axis.

4. A device according to claim 1, wherein said first mounting means is disposed radially outward of said second mounting means.

5. A device according to claim 1, wherein the first mounting means is operatively connected to said second mounting means whereby said motive means moves said first mounting means which moves said second mounting means.

6. A device according to claim 5, wherein said second mounting means includes spring arms and
    said operative connection includes cam means operatively connected to said first mounting means for moving said arms generally radially inward as said first mounting means move generally radially inward.

7. A device according to claim 6, wherein said first mounting means includes a pair of jaws moveable radially inward.

8. A device according to claim 7, wherein said jaws are connected by linkage means moveable in a direction at an angle to said axis whereby said movement causes the ends of said jaws to move generally radially inward.

9. A device according to claim 1, wherein said motive means is a pair of handles,
    the means to move said blade means axially apart includes bar means connecting one of said handles to a portion of said second mounting means, and
    spring means preventing said bar means from causing axial movement of said blade means until said limit of movement of said blade means in said plane is reached.

10. A device according to claim 8, wherein said motive means is a pair of handles,
one of said handles is pivotally connected at one point to one of said jaws and at another point to said linkage, and
the other end of said linkage is connected to the other jaw,
whereby movement of said one handle causes both jaws to move towards each other.

11. A device according to claim 1, wherein said blade means is mounted to overlap an adjacent blade means so that said blade means define an opening which is substantially square in configuration of said blade means move towards each other.

12. A device according to claim 1,
wherein stop means limit the movement of said first and second blade means in the same plane before the mounting means moves the second blade means axially away from the first blade means.

13. A device for stripping insulation from a wire, comprising,
first blade means of at least two blades having cutting edges,
first mounting means mounting said blades of the first blade means at an angle to each other and at an angle to an imaginary axis,
the first mounting means being movable to move at least one of the blades of the first blade means towards another of said blades to a location where the cutting edges of said blades are substantially in the same plane,
second blade means of at least two blades having cutting edges,
second mounting means mounting said blades of the second blade means at an angle to each other and at an angle to the blades of the first cutting means,
the second mounting means being movable to move at least one of the blades of the second blade means towards another of the blades of the second blade means to a location wherein the cutting edges of said blades of the second blade means are substantially in the same plane with the cutting edges of the blades of the first blade means, and then to move the second blade means axially of the imaginary axis away from the first blade means, and
motive means operably connected to the first and second mounting means to move said mounting means.

* * * * *